J. F. ELLIOTT.
Water-Trough for Hogs.
No. 217,080. Patented July 1, 1879.
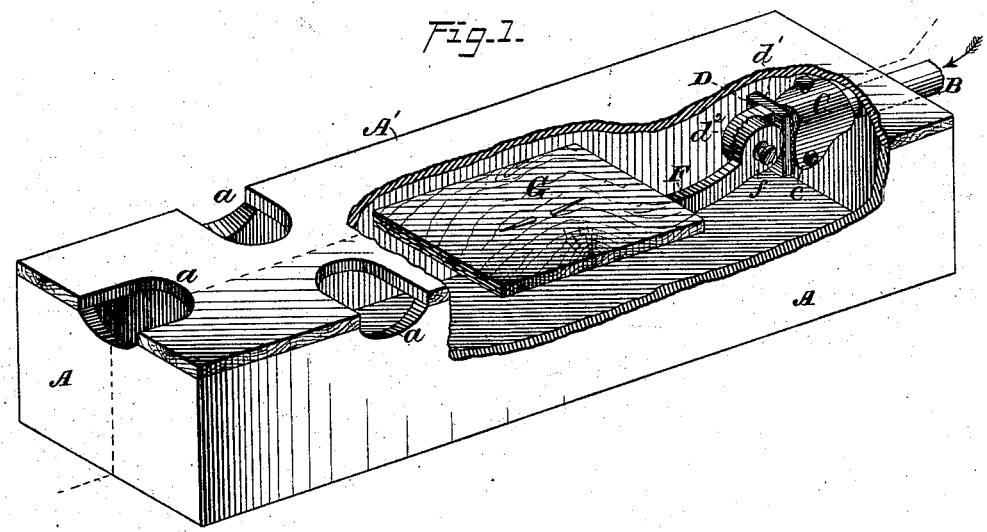
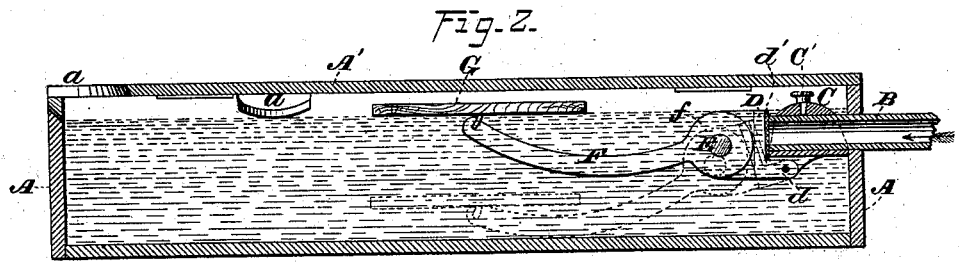
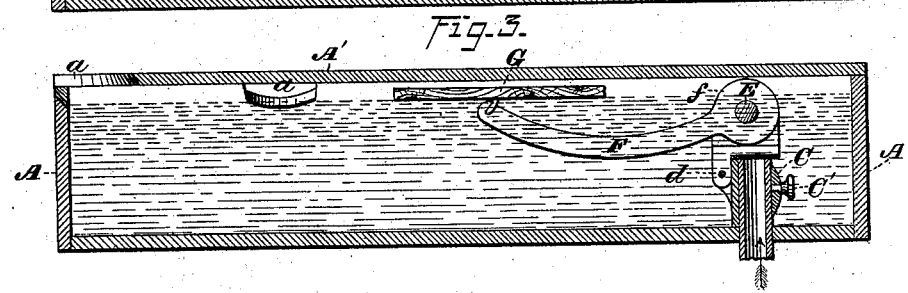
WITNESSES:
INVENTOR:

UNITED STATES PATENT OFFICE.

JAMES F. ELLIOTT, OF PRINCETON, ILLINOIS.

IMPROVEMENT IN WATER-TROUGHS FOR HOGS.

Specification forming part of Letters Patent No. 217,080, dated July 1, 1879; application filed March 21, 1879.

*To all whom it may concern:*

Be it known that I, JAMES F. ELLIOTT, of Princeton, in the county of Bureau, and in the State of Illinois, have invented certain new and useful Improvements in Water-Troughs for Hogs; and do hereby declare that the following is a full, clear, and exact description thereof, reference being had to the accompanying drawings, making a part of this specification, in which—

Figure 1 is a perspective view of a trough containing my automatic water-supply regulator. Fig. 2 is a central longitudinal section of the same upon a vertical line; and Fig. 3 is a like view of said trough, the water-supply pipe being arranged within the bottom.

Letters of like name and kind refer to like parts in each of the figures.

The design of my invention is to furnish a convenient and cleanly means whereby hogs may be supplied with water; and it consists in the means employed for automatically regulating the height of water within the trough, substantially as and for the purpose hereinafter specified.

In the annexed drawings, A represents a tank or trough which has, preferably, a length of about four feet, a width of one foot, and a depth of eight inches, and is constructed of or from wood, iron, or other suitable material.

The trough A is inclosed at its upper side by means of a cover, A', within which and within the upper edge of said trough are provided a number of openings, $a$, that have each such size and shape as to enable the snout of a hog to pass through the same into the interior of the latter. Said openings are arranged at and near one end of said trough, and are sufficiently separated to enable a hog to make use of each without interference with each other.

If the trough A is now filled with water nearly to its upper edge hogs can easily and readily drink therefrom through the openings $a$ without opportunity for slopping said water over or fouling the same, by which means no waste occurs, and the surroundings of the tank are prevented from becoming wet and unwholesome.

In order that the water within the trough A may be maintained at a uniform level, the following-described mechanism is employed for automatically regulating the supply.

A water-supply pipe, B, preferably iron, passes inward through the top, bottom, or end at a point most distant from the portion containing the openings $a$. The inner end of the pipe B is cut squarely and smoothly, and upon the projecting portion of said pipe within the tank A is fitted a block, C, which has the form shown in Fig. 1, is held in place thereon by means of a set-screw, C', and is provided at its outer end with two ears, $c$. Pivoted or hinged to or between the ears $c$ is an ear, $d$, of a valve, D, which valve has the form shown in Fig. 1, and upon its face has secured a rubber face, $d^1$, that, when said valve is turned against the pipe B, impinges upon and closes the end of the same.

Upon the rear side of the valve D is provided a lug, $d^2$, which has upon one side a face that is in a line with the plane of motion of said valve, and is preferably roughened or grooved upon lines that radiate from its center. Secured to or upon the lug $d^2$ by means of a screw, E, which passes horizontally through their centers, is a circular flat disk, $f$, that is formed upon one end of a bar, F, which has longitudinally a curved form, as seen in Figs. 2 and 3, and by means of said screw may be secured to said valve-lug at any desired radial position.

Hinged to or upon the outer end of the bar F is a wooden float, G, which has preferably a size horizontally of ten to twelve inches, and a thickness of from three-quarters to one and a half inch, and is arranged with its longest axis lengthwise of the trough.

In adjusting the mechanism the parts are connected as shown in Figs. 2 and 3, dependent upon the direction from which the pipe B enters the trough, and water is admitted until said trough is filled to the proper level.

The screw E is now loosened, the float G is permitted to rest upon the surface of the water, and the valve D is pressed firmly upon or against the end of the pipe B, after which said screw E is tightened until the bar F is firmly connected to said valve.

As thus arranged the withdrawal of water from the trough A will lower the water-level and cause the float G and the outer end of the arm F to fall, by which means the valve D will uncover the end of the supply-pipe B and admit a current of water to said trough, the flow continuing until the water-level is raised to its normal height and said valve is again closed by the action of said float.

The operation described is automatically performed as often as any material quantity of water is taken from the trough, and not only causes a uniform water-level to be maintained, but in consequence of the frequent renewal of the contents of said trough renders the supply more pure and wholesome than would be practicable otherwise without waste.

The valve, float-bar, and pivotal block may be constructed and sold, and the trough and float made for the user by any ordinary workman, said latter parts requiring no more skill than is possessed by farmers generally.

Having thus fully set forth the nature and merits of my invention, what I claim as new is—

As a means for automatically regulating the height of water within a tank or trough, the block C, provided with the ears $c$, and adapted to fit over the pipe B, the valve D, pivoted or hinged upon said block, and having the rubber face $d^1$ and lug $d^2$, the bar F, provided with the flattened end $f$, and secured to and made adjustable upon said lug $d^2$, and the float G, loosely connected to or with the outer end of said bar, said parts being combined with each other, said pipe B, and a tank or trough, substantially as and for the purpose specified.

In testimony that I claim the foregoing I have hereunto set my hand this 12th day of March, 1879.

JAMES F. ELLIOTT.

Witnesses:
CLARK WAY,
M. U. TRIMBLE.